United States Patent [19]

Dearing et al.

[11] 4,268,143
[45] May 19, 1981

[54] PHOTOGRAPHIC CAMERA WITH PROVISION FOR RECORDING SUPPLEMENTAL DATA

[75] Inventors: Le Roy M. Dearing, Studio City; Edgar D. Wiegand, Sherman Oaks, both of Calif.

[73] Assignee: L. M. Dearing Associates, Inc., Studio City, Calif.

[21] Appl. No.: 90,053

[22] Filed: Oct. 31, 1979

[51] Int. Cl.³ .............................................. G03B 17/24
[52] U.S. Cl. ...................................... 354/106; 354/275
[58] Field of Search ......................... 354/275, 105–109

[56] References Cited

U.S. PATENT DOCUMENTS 3,953,868  4/1976  Kawamura et al. ................. 354/109

*Primary Examiner*—John Gonzales
*Attorney, Agent, or Firm*—Fulwider, Patton, Rieber, Lee & Utecht

[57] ABSTRACT

A camera provided with an illuminated display positioned behind the frame to be exposed, the display being contained within a space defined by the back of the film. One of the guide rollers that positions the film is divided to leave a gap at its center permitting a data image from the display to be recorded on a portion of the film near the edge of a frame that would otherwise be obscured. Interchangeable components may be used to permit the data to be superimposed on the primary image or recorded in a space between frames.

16 Claims, 11 Drawing Figures

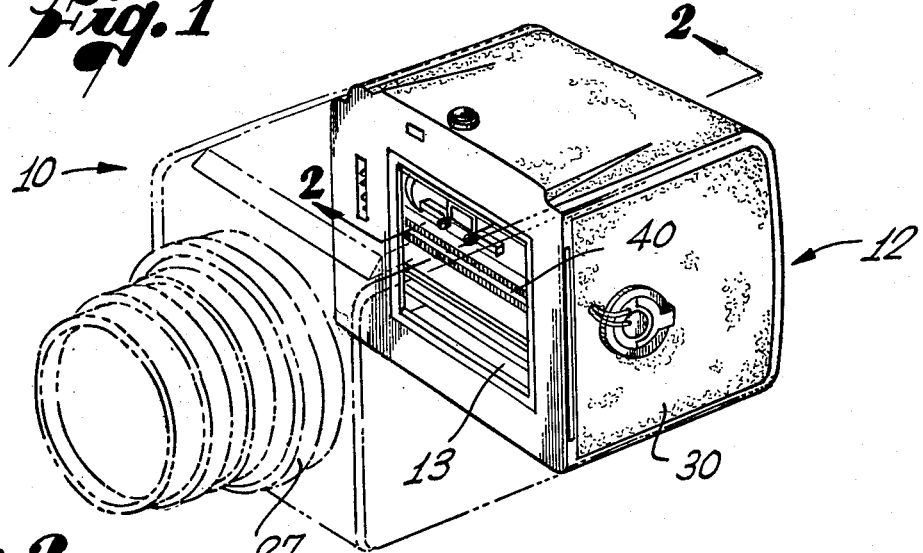
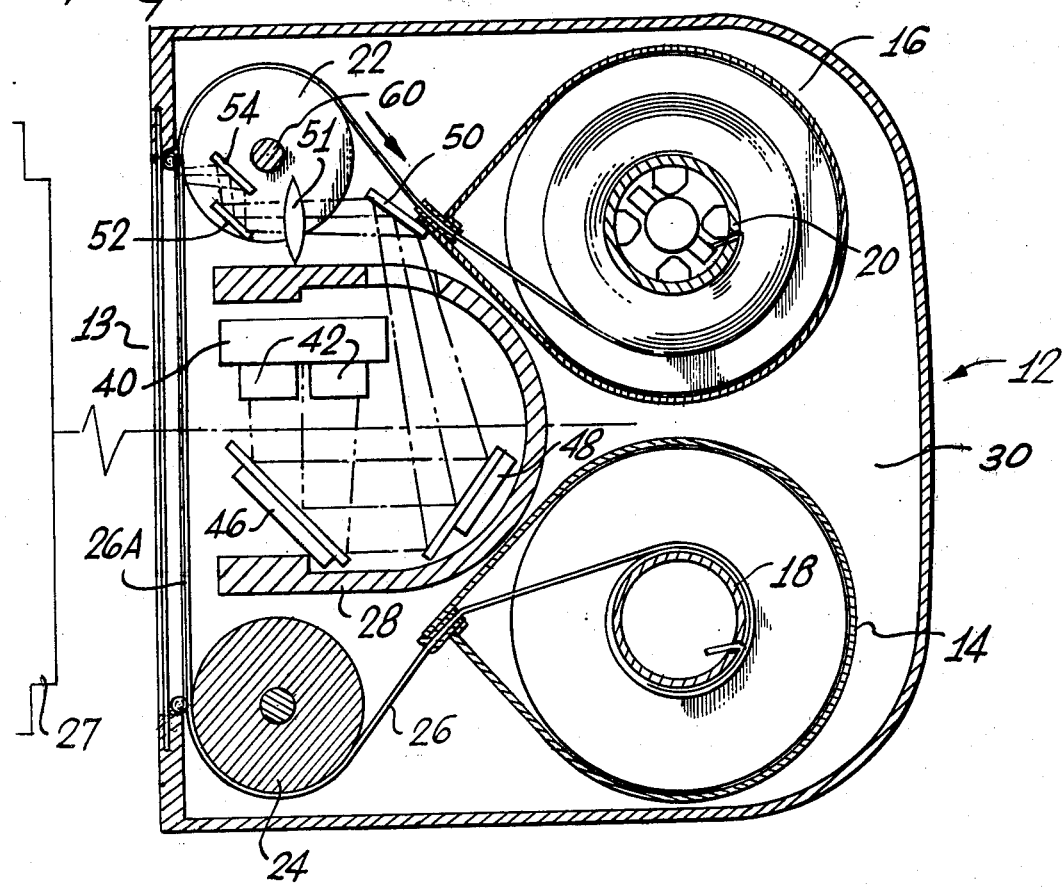

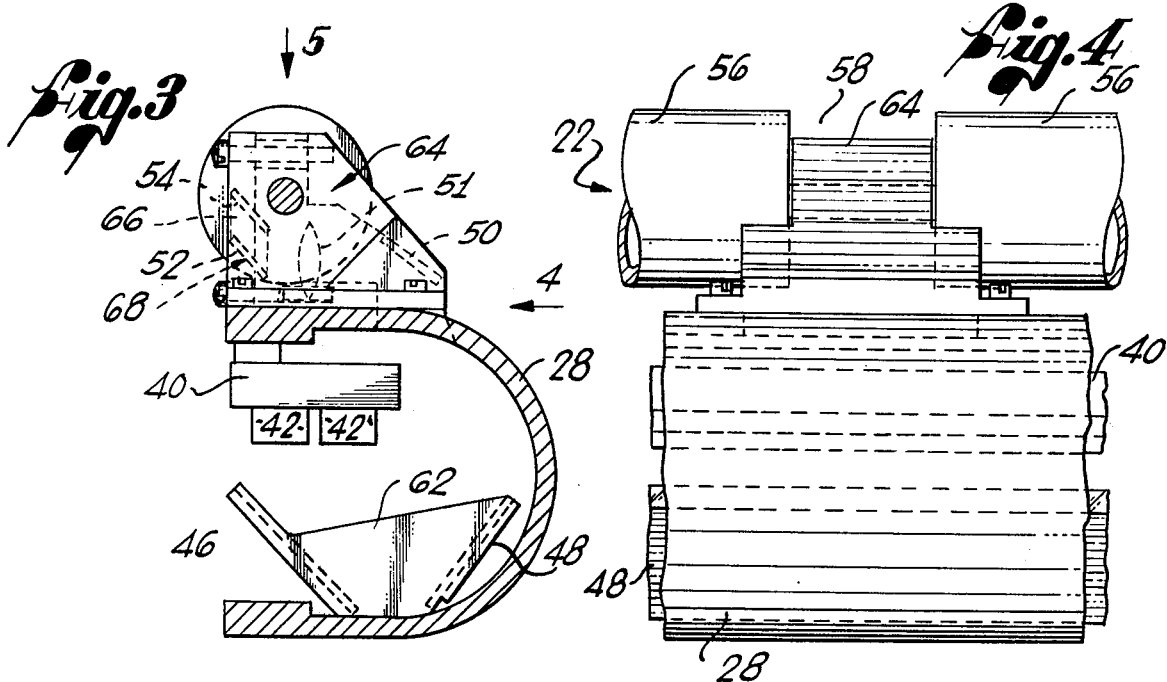
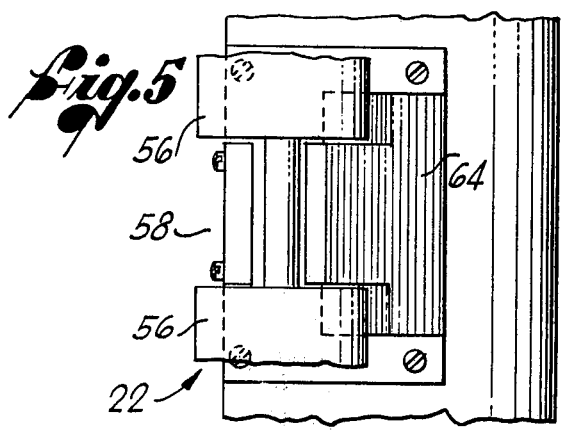
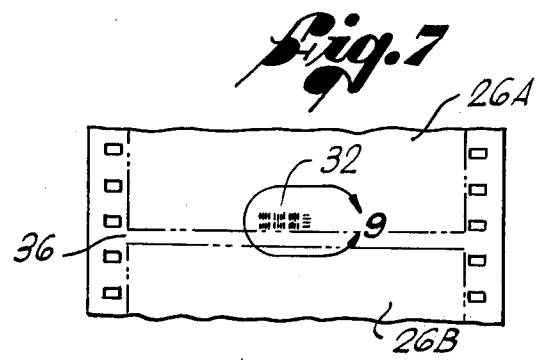
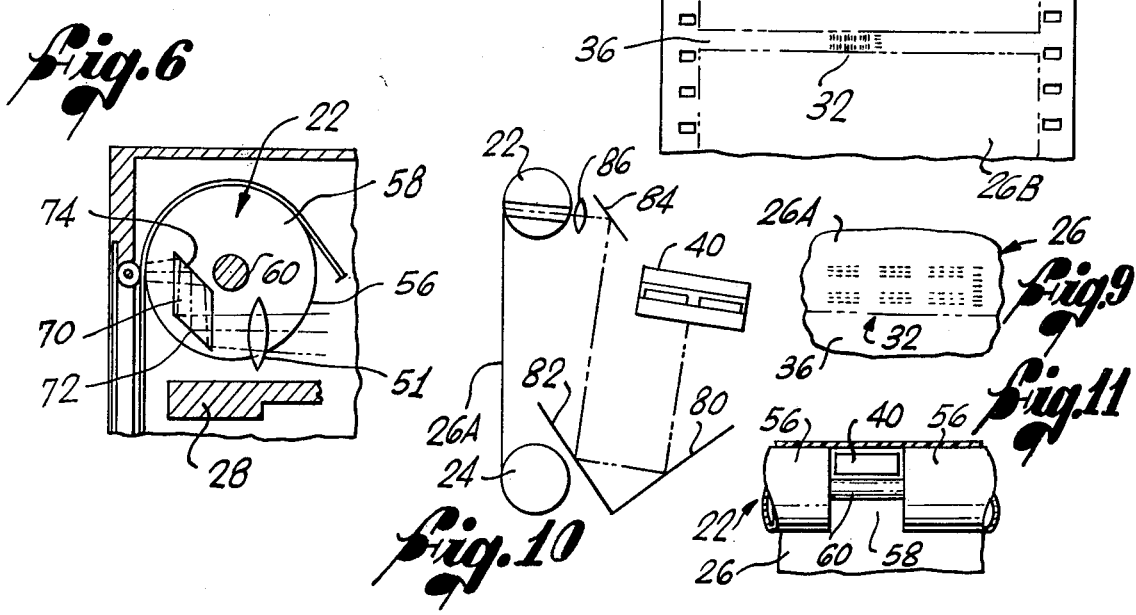

PHOTOGRAPHIC CAMERA WITH PROVISION FOR RECORDING SUPPLEMENTAL DATA

FIELD OF THE INVENTION

The present invention relates to photography, and, more particularly, to cameras having provisions for recording data adjacent to or superimposed on the frames.

BACKGROUND OF THE INVENTION

It is often desired to record data on photographic film, the data being arranged so that it is adjacent to or superimposed on individual frames on the film to which the data relates. For example, one may wish to record the time at which the exposure was made, the aperture and shutter setting, and the film speed. Alternatively, one may wish to identify the subject photographed on a particular frame by coded indicia. In aerial photography, one may wish to record the precise latitude and longitude at which a phototgraph is taken along with the time of day.

Conventionally, data is recorded by providing an electronically controlled solid state illuminated display arranged to project an image onto the emulsion side of the film or onto the back of the film. The display itself may be positioned within the body of the camera and driven by an external signal source. The incorporation of a digital display within a previously designed camera is often difficult task because there is typically very little room available within a camera body. This is particularly true in the case of the well designed high quality cameras that it is most often desired to equip with such a display.

It is a principle objective of the present invention to provide an arrangement for incorporating an illuminated information display for recording data in a camera in which very little space is available for the installation of this equipment. Another objective of the invention is to provide such an arrangement that is capable of recording data either on the frames or in spaces between the frames, as desired by the user.

SUMMARY OF THE INVENTION

A camera in which the invention resides has a camera lens for recording a primary image, a film supply spool, a film take-up spool, and a pair of film guide rollers. An illuminated display device is positioned within a space defined by the back of the film to provide a data image to be recorded through the back of the film.

One of the rollers is divided into two roller sections with a gap between them. The data image is projected onto the film within the gap.

Preferably, the image is projected by a folded optical system including a plurality of reflection surfaces. An odd number of reflection surfaces should be used to provide a non-inverted image. Alternatively, the display device itself can be positioned within the gap, close enough to the film that no projection system is required.

According to another aspect of the invention, the position of the data image with respect to the frames of the film can be varied by removing a mirror unit that includes two reflection surfaces and substituting a prism. The light transmissive material of the prism has a different index of refraction when compared to the air between the mirrors. It is, therefore, possible to focus the image from a data lens at a different location on the film.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 is a perspective view of a camera in which the present invention is incorporated, all portions of the camera except the magazine being shown in phantom lines;

FIG. 2 is a cross-sectional view of the magazine taken substantially along the lines 2—2 of FIG. 1, a diagramatic representation of the camera lens being added and some of the mirror supporting structure being omitted;

FIG. 3 is a fragmentary cross-sectional view showing the mirror supporting structure omitted in FIG. 2;

FIGS. 4 and 5 are fragmentary views taken as indicated by the arrows 4 and 5, respectively in FIG. 3;

FIG. 6 is another fragmentary cross-sectional view showing the substitution of an interchangable prism for two of the mirrors shown in FIGS. 2 and 3;

FIGS. 7 and 8 are fragmentary views of the developed film showing the positions of the recorded data on the film;

FIG. 9 is an enlarged view of a portion of the film of FIG. 7 showing the area indicated by the arrow 9;

FIG. 10 is a diagramatic illustration of a second embodiment of the invention; and FIG. 11 is a fragmentary, cross-sectional view, similar to FIG. 6, showing a third embodiment of the invention.

DESCRIPTION OF THE PREFERRED EMBODIMENTS

A camera 10 constructed in accordance with the present invention, best shown in FIGS. 1 and 2 of the accompanying drawings, is a modification of a commercially available Hasselblad model 500C/M. It is a single lens reflex camera that uses $2\frac{1}{4}'' \times 2\frac{1}{4}''$ film. While the invention is explained with reference to this particular camera 10, it will be understood that the principles set forth here can be applied to other cameras of generally similar construction.

Since the modifications of the camera 10 pertain only to a detachable magazine 12, the remainder of the camera is shown only in phantom lines in FIG. 1. The magazine 12 is a box-like structure with an open front 13 that, when attached, forms the rear part of the camera body.

At the back of the magazine 12 are a supply cartridge 14 and a take-up cartridge 16 containing supply and take-up spools 18 and 20, respectively. Parallel to the spools 18 and 20 are an upper film guide roller 22 and a lower film guide roller 24 positioned along the top and bottom edges of the open front 13. A film 26 extends forwardly from the supply spool 18 and out of the supply cartridge 14, over the bottom of the lower film guide roller 24, upwardly across the open front 13 of the magazine 12, around the upper film guide roller 22, into the take-up cartridge 16, and around the take-up spool 20. A single frame 26A is thus held flat by the rollers 22 and 24 and behind the camera lens 27 that forms a primary image on the emulsion side of the film 26.

Located between the film guide rollers 22 and 24, where it does interfere with the film 26, is a U-shaped wall 28, opening toward the front 13 of the magazine 12. This wall 28 extends transversely between a pair of magazine side walls 30 for increased strength and rigidity. It is enclosed within a space roughly defined by the roller 22 and 24 and the spools 14 and 16.

It is desired to provide the camera 10 with the capability to photographically record alpha-numeric data 32 on the film 26. So that this data image will not interfere with the primary image recorded through the camera lens 27, it should be placed adjacent to the edge of the frame 26A, as shown in FIG. 7, or else it should be placed in a narrow space 36 between successive frames 26A and 26B, as shown in FIG. 8. However, in an unmodified camera similar to the camera 10, this portion of the film 26 is not readily accessible because it is blocked by the film guide rollers 22 and 24. Moreover, the camera 10 is built to be as compact as possible and very little space is available for additional components.

According to the invention, a solid state illuminated display device 40 is positioned transversely within the U-shaped wall 28, supported by the top of the wall so that it faces downwardly parallel the open front 13 of the magazine 12. In this preferred embodiment, the display 40 includes twenty-eight elements 42, each of which is an LED matrix capable of representing a letter or digit. Most of these elements 42 are arranged in rows extending transversely with respect to the film 26 to provide the data image format 32 shown in FIG. 9.

The display 40 itself can be any of a variety of commercially available electronic components and its internal construction and operation do not form part of the present invention. It should be understood, however, that the display 40 is responsive to an external input and can be connected to a wide variety of electronic devices, depending upon the nature of the data to be recorded.

It is also possible to use a different type of data display, such as a liquid crystal device with external illumination. If desired, all or part of the display could be in the form of a replaceable printed card that would present the same data image to each successive frame.

In the display device 40 of the preferred embodiment, the elements 42 project an illuminated dislay downwardly, parallel to frame of the film 26A, to a first mirror 46 that extends across the bottom of the U-shaped wall 28. This first mirror 46 is disposed at a forty-five degree angle to the vertical so that it projects the data image horizontally into the magazine 12, perpendicular to the frame 26A that is ready for exposure. The data image is then reflected by second mirror 48 upwardly and slighty toward the open front 13 of the U-shaped wall 28. A third mirror 50 that reflects the data image forwardly is mounted on top of the U-shaped wall 28 just beneath the film 26 extending from the take-up cartridge 16 to the upper film guide roller 22.

From the third mirror 50, the data image is projected horizontally, perpendicular to the frame 26A, through a display lens 51 that focuses the image on the film 26. After passing through the display lens 51, the image is reflected upwardly a short distance by a fourth mirror 52 and it is projected horizontally again onto the film 26, at the desired location, by a fifth mirror 54. The data image thus passes directly through the back of the film 26 to create a photographic record.

The mirrors 46, 48, 50, 52 and 54 and the display lens 51 form a folded optical system that projects the data image onto the film 26. As the image travels toward the film 26, each successive mirror can be smaller. Thus, the display 40 requires most of the width of the magazine 12 but the last mirror 54 requires only a small portion of that width.

Proper positioning of the last two mirrors 52 and 54 to locate the data image on the desired portion of the film 26, is possible because of the unique construction of the upper film guide roller 22 (see FIGS. 3, 4 and 5). This roller 22 is divided into two roller sections 56 axially separated by a center gap 58. An axle 60 extends across the gap 58 to join the two sections 56.

Within the gap 58, the last mirror 54 is at a forty-five degree angle, being in front of and extending slightly below the axle 60. The next-to-last mirror 52 is directly below the last mirror 54, just within the outer circumference of the adjacent roller sections 56.

The divided roller 22 is capable of guiding the film 26 in substantially the same manner as a conventional undivided roller. The film 26 has little if any, tendency to crease or buckle at that point because it is curved by the roller 22 and is pulled fairly tight. It is preferable that the roller 22 nearest the take-up spool 20 be divided rather than the roller 24 nearest the supply spool 18 since the film has greater strength after it has been exposed.

The first two mirrors 46 and 48 are precisely positioned by inverted, generally trapezoidal, side plates 62, one at each end, fastened to the bottom of the U-shaped wall 28. The last three mirrors 50, 52 and 54 are positioned by a small housing 64 mounted atop the U-shaped wall 28, covering the aperture. In FIG. 2, the side plates 62 and the housing 64 are omitted to show the mirrors 46 and 48 more clearly.

When the arrangement of FIG. 2 is used, the data image is projected onto the upper edge of the frame 26A that is in position to be exposed (FIG. 7). If, however, it is desired to record the data image between two successive frames 26A and 26B (FIG. 8), the last two mirrors 52 and 54, which are joined by a mirror holder 66, are removed as a unit 68. In place of this mirror unit 68, a parallelogram shaped prism 70 is inserted having two parallel reflection surfaces 72 and 74 that are substituted for the mirrors 52 and 54 (see FIG. 6). The distance between the reflection surfaces 72 and 74 of the prism 70 is greater than the distance between the mirrors 52 and 54, with the result that the data image is displaced upwardly off the frame 26A into the area 36 between frames, as shown in FIG. 8. In both arrangements, however, the data image is produced within the bounds of the gap 58.

Substitution of the prism 70 for the mirror unit 68 has the effect of lengthening the optical light path from the display lens 51 to the film 26. Thus, if the data image is in focus when the mirror unit 68 is used (FIG. 3), it would be expected to be out of focus when the prism 70 is used (FIG. 6). Proper focus is maintained, however, because the index of refraction of transparent glass or plastic that forms the prism 70 is different from that of the air separating the mirrors 52 and 54, compensating for the change in the length of the optical light path.

It will be noted that mirrors have been used to define the optical light path in the embodiment of FIG. 3 and part of the optical light path in FIG. 6. However, prisms could be substituted to provide any or all of the necessary reflection surfaces. The number of reflection surfaces used in the apparatus described above is five, but this number may be varied. For instance, an arrangement of three reflection surfaces, shown diagramatically in FIG. 10, is suitable if slightly more space is available within the magazine 12 (similar reference numbers being used for similar components).

In this arrangement, the display 40 is positioned farther from the frame 26A and the data image is projected downwardly and slightly forwardly toward the frame 26A ready to be exposed. A first mirror 80 reflects the image forwardly and slightly upwardly at a ninety degree angle, after which a second mirror 82 reflects the image at a ninety degree angle, upwardly and slightly to the rear. A third mirror 84 reflects it forwardly and slightly upwardly. The image then passes through a display lens 86 and strikes the frame 26A at a slightly oblique angle. This arrangement has the advantage of reducing the number of components required.

An odd number of reflection surfaces should be used to produce a non-inverted image projected through the back of the film 26, assuming that the display 40 produces a non-inverted image. A non-inverted image would also be produced if no reflection surfaces were used. The reflection surfaces could be eliminated entirely by the use of fiber optics.

Alternatively, the illuminated display can be produced in contact with the film 26, with no projection system, if the display device 40 is disposed within the gap 58 in the divided roller 22, as shown in FIG. 11. A larger camera 10 or a smaller display 40 is required. In all of the arrangements described above, the data image is projected onto the back, i.e., non-emulsion side, of the film 26. The display 40 and its associated optical system are positioned within a space defined by and substantially enclosed by a film envelope extending around the rollers 22 and 24.

It will be apparent from the description above that the present invention provides for the recording of data within a camera that allows very little room for added components and severely limits access to the film. It accomplishes this objective without adding to the external size of the camera and without interfering with the other functions of the camera.

While particular forms of the invention have been illustrated and described, it will be apparent that various modifications can be made without departing from the spirit and scope of the invention.

We claim:

1. A photographic camera comprising:
   a camera lens for recording a primary image;
   a film supply spool;
   a film take-up spool;
   a pair of film guide rollers so disposed that when said camera is loaded with film the back of said film defines a space behind said camera lens, a frame of said film being held between said rollers to be exposed through said camera lens, one of said rollers being divided into two axially separated roller sections with a gap therebetween; and
   display means within said space for providing an illuminated data image to be recorded through the back of said film within said gap.

2. The apparatus of claim 1 further comprising projection means for projecting said data image through said gap and through the back of said film.

3. The camera of claim 2 wherein said projection means comprises a folded optical system having a display lens and a plurality of reflection surfaces arranged within said space.

4. The apparatus of claim 3 wherein said projection means further comprises a plurality of interchangeable elements for varying the length of the optical light path from said display lens to said film, at least one of said interchangeable elements including a substantially transparent material through which said optical light path extends to maintain said film in focus with respect to said display lens despite a variation in the location at which said information display is projected on said film.

5. The apparatus of claim 4 wherein one of said interchangeable elements forms a prism that includes two of said reflection surfaces.

6. The apparatus of claim 3 wherein there are an odd number of said reflection surfaces.

7. The apparatus of claim 3 wherein said divided roller has an axle connecting said roller sections, the one of said reflection surfaces that is farthest from said display means being located within said gap.

8. The apparatus of claim 2 wherein said projection means comprises:
   display lens means for focusing the output of said display means;
   a first reflection surface arranged to receive light from said display means projected along a path substantially parallel to said frame;
   a second reflection surface arranged to receive light from said first reflection surface projected along a path substantial perpendicular to said frame;
   a third reflection surface arranged to receive light projected from said second reflection surface;
   a fourth reflection surface arranged to receive light projected from said third reflection surface; and
   a fifth reflection surface arranged to receive light projected from said fourth reflection surface and to project said light onto said film.

9. The apparatus of claim 8 wherein said fourth and fifth reflection surfaces are so arranged that said light projected onto said fifth reflection surface is projected substantially parallel to said frame and said light projected from said fifth surface onto said film is projected substantially perpendicular to said film.

10. The apparatus of claim 8 wherein said divided roller has an axle connecting said roller sections, the one of said reflection surfaces that is farthest from said display means being located within said gap.

11. The apparatus of claim 10 wherein said projection means further comprises a plurality of interchangeable elements for varying the length of the optical light path from said display lens to said film, at least one of said interchangeable elements including a substantially transparent material through which said optical light path extends to maintain said film in focus with respect to said display lens despite a variation in the location at which said information display is projected on said film.

12. The apparatus of claim 1 wherein said display means is disposed within said gap.

13. A photographic camera comprising:
   a body including a box-like magazine section having a top, a bottom, a pair of sides, a back and an open front;
   a pair of film guide rollers disposed along opposite edges of said open front, one of said rollers being divided into axially separated roller sections with a gap therebetween;
   a supply cartridge and a take-up cartridge positioned so that film can extend from said supply cartridge to one of said film guide rollers, across said open front to the other of said film guide rollers, and to said take-up cartridge, a space being substantially enclosed by said film guide rollers, said take-up cartridge, said supply cartridge, said film and said sides;

display means within said space for providing a variable, illuminated, alpha-numeric data image in response to an electronic input; and projection means for projecting said data image through said gap and through the back of said film to photographically record said information.

14. The camera of claim 13 wherein said magazine portion includes a U-shaped wall opening toward said open end, said display means being disposed within said wall.

15. The camera of claim 13 wherein said projection means comprises a folded optical system having a display lens and a plurality of reflection surfaces arranged within said space.

16. The apparatus of claim 13 wherein said projection means further comprises a plurality of interchangeable elements for varying the optical light path from said display lens to said film, at least one of said interchangeable elements including a substantially transparent material through which said optical light path extends to maintain said film in focus with respect to said display lens despite a variation in the location at which said information display is projected on said film.

* * * * *